(12) United States Patent
Yang et al.

(10) Patent No.: US 10,902,650 B2
(45) Date of Patent: Jan. 26, 2021

(54) X-RAY BEAM-HARDENING CORRECTION IN TOMOGRAPHIC RECONSTRUCTION USING THE ALVAREZ-MACOVSKI ATTENUATION MODEL

(71) Applicant: FEI Company, Hillsboro, OR (US)

(72) Inventors: Qiheng Yang, Gungahlin (AU); Glenn Myers, Waramanga (AU); Shane Latham, Griffith (AU); Adrian Sheppard, Fisher (AU); Andrew Kingston, Kambah (AU)

(73) Assignee: FEI Company, Hillsboro, OR (US)

( * ) Notice: Subject to any disclaimer, the term of this patent is extended or adjusted under 35 U.S.C. 154(b) by 138 days.

(21) Appl. No.: 16/110,264

(22) Filed: Aug. 23, 2018

(65) Prior Publication Data

US 2019/0325618 A1    Oct. 24, 2019

Related U.S. Application Data

(60) Provisional application No. 62/659,887, filed on Apr. 19, 2018.

(51) Int. Cl.
*G06T 11/00* (2006.01)
*G01N 23/046* (2018.01)

(52) U.S. Cl.
CPC .......... *G06T 11/006* (2013.01); *G01N 23/046* (2013.01); *G01N 2223/401* (2013.01); *G01N 2223/419* (2013.01); *G06T 2211/424* (2013.01)

(58) Field of Classification Search
CPC ............. G06T 11/006; G06T 2211/424; G06T 11/005; G06T 2211/408; G01N 23/046;
(Continued)

(56) References Cited

U.S. PATENT DOCUMENTS

2003/0156684 A1*  8/2003  Fessler ............... A61B 6/032
                                                         378/210
2014/0355740 A1* 12/2014  Koehiler ............ A61B 6/484
                                                         378/62
(Continued)

OTHER PUBLICATIONS

Luo et al., "A fast beam hardening correction method incorporated in a filtered back-projection based MAP algorithm", Physics in Medicine & Biology, 62 (2017) 1810-1830 (Year: 2017).*
(Continued)

*Primary Examiner* — Qian Yang (57) ABSTRACT

Methods and apparatuses disclosed herein provide beam hardening correction to tomographic reconstruction using a simplification to the Alvarez-Macovski attenuation model. An example method includes simplifying a forward projection model, the forward projection model based on an Alvarez-Macovski (AM) attenuation model, wherein the simplification of the forward projection model simplifies the AM attenuation model for one of photoelectric effect only, constant density, constant atomic number, and density proportional to atomic number, and performing an iterative reconstruction of a sample using the simplified forward projection model, the iterative reconstruction weighted by a first spectrum, wherein measured image data of the sample used in the iterative reconstruction is obtained at a first energy, and wherein a reverse operation of the iterative reconstruction is a non-adjoint to the simplified forward projection model.

20 Claims, 8 Drawing Sheets

(58) Field of Classification Search
CPC ....... G01N 2223/401; G01N 2223/419; G01N 2223/3035; G01N 2223/1016; G01N 2223/03

See application file for complete search history.

(56) References Cited

U.S. PATENT DOCUMENTS

2015/0286785 A1* 10/2015 Hielscher ............. A61B 5/0073
 382/131
2015/0371414 A1* 12/2015 Choi ..................... G06T 11/005
 382/131
2016/0267688 A1*  9/2016 Sulatycke ............. G06T 11/006

OTHER PUBLICATIONS

Paziresh et al., "Tomography of atomic number and density of materials using dual-energy imaging and the Alvarez and Macovski attenuation model", Journal of Applied Physics 119, 214901 (Year: 2016).*

* cited by examiner

X-RAY BEAM-HARDENING CORRECTION IN TOMOGRAPHIC RECONSTRUCTION USING THE ALVAREZ-MACOVSKI ATTENUATION MODEL

FIELD OF THE INVENTION

This application is generally directed toward computed tomography, and more specifically directed toward beam hardening correction of tomographic reconstructions.

BACKGROUND OF THE INVENTION

Tomography, or Computed Tomography (CT), is the process of forming a three-dimensional model of an object by combining 2D projections of the object of interest typically obtained through the use of any kind of penetrating particle or wave. Tomography is a rapidly advancing imaging technology with broad applications in such varied fields such as but not restricted to medicine, dentistry, biology, environmental, toxicology, mineralogy, and electronics. Tomographic processes use various tools, such as x-ray systems, transmission electron microscopes (TEM), and/or scanning transmission electron microscopes (STEM) to obtain various types of information such as, for example, atomic structure and chemical analysis of a sample. A 3D tomography dataset is typically obtained by back projecting a series of 2D images acquired through the sample at different angles.

CT has conventionally been applied to the study of geological samples such as fossils, reservoir rocks and soils as a non-destructive image technique for the past three decades. The number of possible applications has grown with increasing resolution, with computed microtomography ($\mu$CT) imaging techniques now able reach sub-micron resolutions. Along with such increased use, new challenges and opportunities, specifically with regard to the correction of what is referred to as beam hardening effects, present themselves.

The beam hardening effects are, at least partially, due to the scanned material's interaction with the scanning beam that may not be properly accounted for in the particular CT process employed. More specifically, beam hardening effects may be due to the lack of accounting for the spectral nature of the scanning beam and further due to a lack of detecting low energy scanning beam components. The lack of detection of the low energy scanning beam components may be due to the attenuation of the low energy scanning beam components in the scanned material over the higher energy scanning beam components.

There is, in general, insufficient information to perform tomographic reconstruction from polychromatic attenuation data from a single scan. Therefore, beam hardening presents a problem that seems computationally insoluble, unless assumptions can be made about the sample. While numerous methods have been proposed that target specific cases (such as imaging of bone and tissue) or that require large computing overhead, no method has seen widespread adoption for $\mu$CT imaging. Therefore, as other artefacts of x-ray imaging have been dramatically reduced in recent years, beam hardening has become one of the major sources of imaging artefacts in many situations and remains one of the key challenges for laboratory-based x-ray tomography. Provided herein are techniques for beam hardening correction that work in situations that are of widespread interest for $\mu$CT imaging.

BRIEF DESCRIPTION OF THE DRAWINGS

Like reference numerals refer to corresponding parts throughout the several views of the drawings.

DETAILED DESCRIPTION OF EMBODIMENTS

Embodiments of the present invention are described below in the context of a tomographic imaging apparatus for micrometer-scale or nanometer-scale computed tomography of small objects, in particular cylindrical samples, using a cone-shaped x-ray beam and a circular or helical scanning (sample) trajectory. However, it should be understood that the methods described herein are generally applicable to a wide range of different tomographic methods and apparatus, including both cone-beam and parallel beam systems, and are not limited to any particular apparatus type, beam type, object type, length scale, or scanning trajectory.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatuses are referred to as "lowest", "best", "minimum," or the like. It will be appreciated that such descriptions are intended to indicate that a selection among many used functional alternatives can be made, and such selections need not be better, smaller, or otherwise preferable to other selections.

As briefly noted above, 3D computed tomography is a major technique for investigating the internal structures of objects, and its attractiveness stems from its convenience, versatility and non-destructiveness. However, tomographic reconstruction from a series of 2D X-ray radiographs produces undesirable features, or artefacts, in the reconstruction. These artefacts are a result of imperfections in the inversion techniques used to construct the volume data from the radiographs. The principle origin of these artefacts is the failure to accurately model the physical scanning process. The reconstruction techniques that have incorrect geometry, poor noise models, and a lack of compensation for relative component (or specimen) motion typically produce undesirable results. In laboratory based tomography, often the most observable artefacts in this category are those that arise from ignoring the polychromatic spectrum emitted from X-ray sources. Assuming a simple monochromatic model in inversion results in beam hardening artefacts. The spectrum of X-ray radiation hardens as it transmits through the specimen. Lower energy (or soft) X-rays are preferentially attenuated over higher energy (or hard) X-rays and the average energy of the resulting X-ray beam is higher as a result. With a harder X-ray beam, the specimen appears to be less attenuating and a set of inconsistent measured data results. If spectral effects are not accounted for in reconstruction, beam-hardening produces the characteristic cupping and streaking artefacts, see FIGS. 9 and 10 for examples. These undesirable features cause variations in grey-scale attenuation in the reconstruction. As a result, it may be unclear to the eye if both objects are made from the same material, and threshold based automatic segmentation becomes impossible.

Beam-hardening artefacts destroy the linearity of the projection process by causing attenuation values of a single material to depend on the context of its surroundings. This prevents simple and robust identification of materials which is a serious impediment to the use of X-ray imaging in applications such as: i) finding irregularities in enamel for dental CT, and ii) identifying the composition of porous rocks in micro-CT for petrophysical modeling. Understandably, significant effort has gone into neutralizing these artefacts. The approaches can be roughly divided into three categories: 1) linearization, 2) spectrum filtering, and 3) iterative reconstruction techniques.

For monochromatic X-rays at energy E, attenuation by a single material with attenuation coefficient μ(E) and thickness t is modeled according to the Beer-Lambert law (equation (1) below). The transmission I of an initial X-ray with intensity $I_0$, based on the Beer-Lambert law, is $$I = I_0 e^{-\mu(E) t}. \qquad (1)$$

The projected attenuation $-\log(I/I_0)$ should therefore increase linearly with material thickness. The linearization technique relies on restoring this linear relationship, such as imaging a wedge and calibrating the change in attenuation along the wedge with the thickness of material. This method is valid for a single material, but since each material has a unique correction curve, it remains an approximation for multi-material samples. As such, correction for multi-material specimens may reduce artefacts but can never fully eliminate them.

Physical filtering of the spectrum (to become more monochromatic) is achieved by inserting some known material of constant thickness between the X-ray source and specimen. This can remove (i.e., filter out) the majority of the low energy X-rays, and effectively pre-hardens the X-ray spectrum before imaging. The effects of beam hardening can be reduced significantly, but with a sacrifice of X-ray flux and signal-to-noise ratio.

Neither linearization nor filtering treat the cause instead of the symptom of the problem since they do not model the actual physics of the projection model and are overly optimistic in carrying out correction in all possible cases with no additional physical information about each specific scenario.

The limitations of linearization and filtering motivate the use of Iterative reconstruction methods which incorporate more information in the projection process in order to more faithfully model image acquisition. Several methods have been developed inside recurring schemes which gradually approximate the actual scans until it is deemed "good enough." The approaches use various amounts of a priori information or make simplifications and additional assumptions of their own.

The main shortcoming of some iterative schemes is their complexity. For the linearization method, a large number of variables need to be optimized in every iteration or as many as eight computationally costly projection/back-projection operations are required per iteration. Therefore, although the prospect of including the correct physical model of attenuation in the reconstruction process is desirable, the complexity in incorporating a statistically and physically correct physical model has meant that these methods have yet to reach wider adoption. For similar reasons the polynomial fit method is unsatisfactory because of the requirement for an accurate segmentation to guarantee convergence. Since segmentation processes are difficult precisely because of the effect of beam hardening on real life materials, this is not really practical when the identity of the materials are unknown, which rules out its application in a large number of scenarios. Another method utilizes the assumption that polychromatic attenuation can be approximated by decreasing the energy of a monochromatic X-ray linearly with respect to the attenuation coefficient of each traversed pixel. This monochromatic X-ray, once emerged from the material, would have the same intensity as a polychromatic X-ray which travelled through the same path in the material. This approximation can be a rough rule of thumb, but is certainly not true in general. In any case this method also introduces additional complexity by introducing two additional parameters that need to be customized depending on the sample, and whose physical intuitions are not obvious.

The Alvarez-Macovski (AM) model of X-ray attenuation is a function of two material properties: material density ρ and atomic number Z. When combined with dual-energy imaging and knowledge of the spectra, the AM model can work with a full polychromatic model for attenuation. Since there are two unknown properties, two sets of independent information must be provided in order to solve for the actual attenuation of the object as a function of E. In dual-energy imaging these two data sets are the scans at the different energies. Because dual-energy imaging takes into account the polychromatic model of attenuation, it inherently takes care of beam-hardening correction during reconstruction process. However, the dual-energy method requires double the scanning time and at least double the reconstruction computation of an ordinary scan, and alignment processes are required to bring the two scans together for comparison and analysis.

To address these problems, the techniques disclosed herein include a simple and straightforward method to incorporate the physics of polychromatic X-ray attenuation within iterative schemes. Several assumptions are proposed that can be made that reduce the two unknown material properties required in the AM X-ray attenuation model into one. Once one of these simplifications is determined, the X-ray energy spectrum may be the only physical information required to carry out the correction. Using these assumptions, we can reconstruct specimen attenuation at a single specified X-ray energy, $E_0$. The forward process simulates the polychromatic experiment with one, or at most two, projection operations. By assuming that all errors lie at $E_0$, the need for an adjoint reverse operation may be ignored, and the reverse process remains simply back-projection at a single energy averaged over the sample.

In some embodiments, the AM model of X-ray attenuation may be implemented in the iterative reconstruction. The AM model includes a term directed to Photoelectric effect based attenuation and a term directed to Compton scattering based attenuation. With regards to X-ray attenuation, material attenuation of photons in the 5-120 keV energy region for X-rays are mainly due to the effects of Photoelectric effect and Compton scattering. The proportion of each part in the total sample varies from each material and at different energies. The Photoelectric effect occurs when an orbiting electron absorbs a photon and is then itself ejected. The probability of such an interaction per unit distance (τ) is related to the number of atoms per unit volume (N) atomic number (Z) and the energy of the photon (E) as given in equation (2) below $$\tau = aN \frac{Z^n}{E^m}(1 - O(Z)). \quad (2)$$

The O(Z) term refers to a second order function of Z which can be ignored in the simplified AM model. The powers n and m are constants and can take values between 3 and 5. A value of 3 will be used herein as the accepted value in the AM model. The inverse cube relation to photon energy means that attenuation due to Photoelectric effect declines rapidly with increasing energy, so even a small difference in attenuation length gives a large difference in attenuation at different energies, therefore Photoelectric effect accounts for most of the effects of beam hardening.

In contrast, Compton scattering remains much more stable over the X-ray region. Compton scattering is when a high energy photon is absorbed and re-emitted by a free electron, while having its path deflected by θ from its original direction. The probability of interaction is given by the Klein-Nishina cross section, which is in the form of equation (3)

$$\sigma = NZf_{KN}(E). \quad (3)$$

Any sufficient implementation of the total photon attenuation therefore needs to account for both the Photoelectric effect and Compton scattering. The combination is proposed in the AM model, which takes the form of equation (4)

$$\mu(E) = \frac{Z}{A}\left(K_1 \rho Z^{n-1} \cdot \frac{1}{E^m} + K_2 \rho f_{KN}(E)\right). \quad (4)$$

Here the total material attenuation per unit length μ at energy E is given by a linear combination of the two phenomena. $K_1$ and $K_2$ are the two coefficients which must be fitted to the actual attenuation curve, and n is a constant normally set to 4. Reasonably, this simplification ignores the effect of X-ray absorption edges, and therefore cannot be an accurate model for high atomic number elements whose k-edges fall within the usual X-ray region. However, it models the general shape of absorption very well, and is simple in the sense that it reduces the attenuation down to just two single material properties, density ρ and atomic number Z.

Figure 1A:
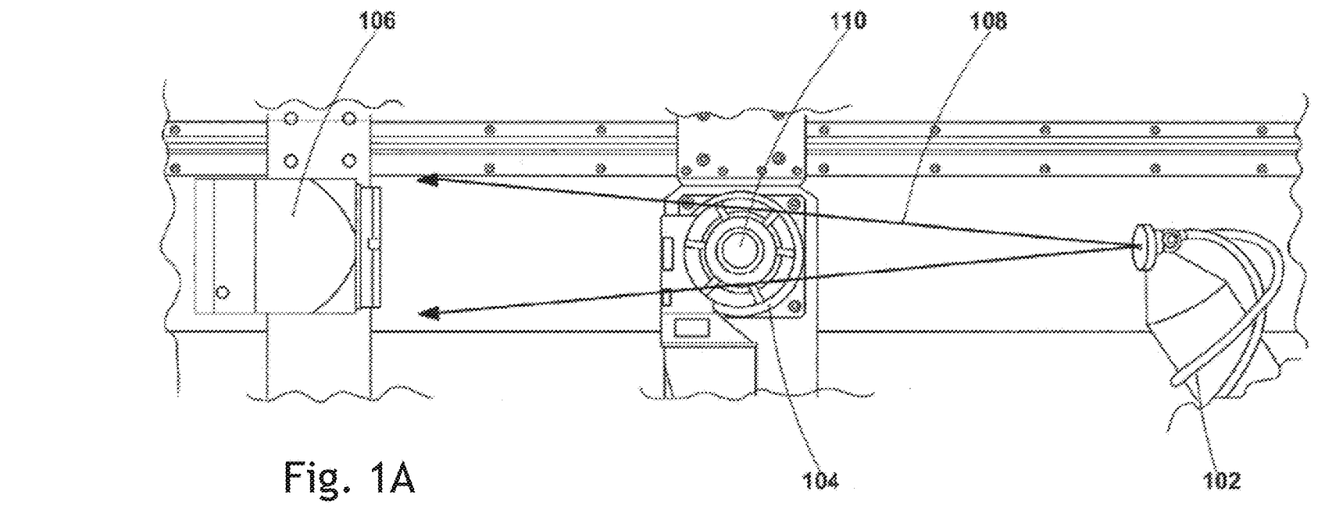
FIGS. 1A and 1B are illustrations of a CT system for obtaining CT scans of samples and correcting beam hardening artefacts in accordance with an embodiment of the present disclosure.
Figure 1B:
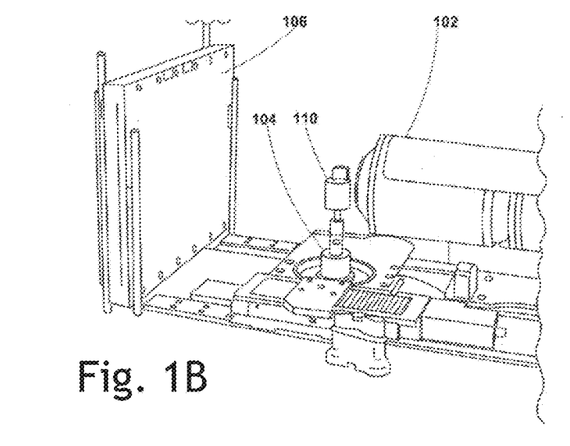

FIGS. 1A and 1B are illustrations of a CT system 100 for obtaining CT scans of samples and correcting beam hardening artefacts in accordance with an embodiment of the present disclosure. The system 100 at least includes an x-ray source 102, a sample stage 104, and a detector 106. The x-ray source 102 generates a cone-shaped x-ray beam 108 that is transmitted through an object 110 mounted on the sample stage 104 to the detector 106. The cone angle and the fan angle are defined, respectively, as the vertical and horizontal half-angles subtended by the detector 106 at the source 102. The detector 106 includes a scintillator that generates visible light when irradiated by x-rays, and a CCD or amorphous silicon flat panel sensor mounted behind the scintillator that generates image data representing two-dimensional images of the spatial arrangement of scintillations generated by the scintillator, thus producing a two-dimensional image or map of x-ray intensity for the x-rays transmitted through the object. As will be appreciated, each of these images shows both external and internal structural features of the object, as projected along the directions of x-rays transmitted through the object to the detector 106. The image data generated by the detector 106 is acquired as a set of images stored in the form of binary data in a computer system (not shown) of the system for subsequent processing. The images are acquired sequentially, with the sample stage 104 being actuated to rotate the sample 110 by a small angle (and, in the case of helical scanning, to also translate the sample or object 110 by a small distance) between successive images, thus providing different geometric projections through the object. These steps are repeated until the sample has undergone a rotation of at least 180°+fan angle and a complete set of projection images has been acquired. In the case of helical scanning, the steps are repeated until the sample 110 has undergone sufficient linear vertical translation and rotation that complete information has been obtained for the region of interest of the sample. While the disclosure uses the movement of the sample 110 with respect to the source 102 and detector 106 to illustrate the sample trajectory, the movement should be considered relative, and in some embodiments, the source 102/detector 106 pair instead move relative to the sample 110.

The x-ray images of the sample 110 are acquired sequentially, with both rotation and translation stages being actuated to rotate and translate the sample by small amounts between successive images, thus providing a series of different geometric projections through the sample 110. As described above, vertical translation and rotation about a vertical axis can be combined to generate a wide range of possible trajectories such that a corresponding series of projections acquired along any one of those trajectories can provide complete information about the sample 110. Such trajectories could include, for example, saddle trajectories, variants of circle-plus-line trajectories, and space-filling type trajectories. Space-filling type trajectories include a plurality of viewing angles spaced out in an array around, at least a part of, the sample 110.

As noted, conventional laboratory-based CT systems, such as the system 100, may provide reconstructions of the sample that include beam hardening artefacts, such as cupping and streaking. See FIG. 9 for examples. These artefacts are typically contributed to the lack of accounting for the spectral content of the x-rays provided by the source 102. While accounting for the spectral content of the x-ray source may provide greater signal-to-noise ratio resulting in higher quality images, the attenuation of the lower energy x-rays by the sample 110 may prevent the desired accounting by conventional reconstruction models. For example, a typical reconstruction may implement an iterative scheme that includes simulating the experiment using both forward and backward projection calculations. However, if the simulation of the forward experiment is not able to account for the spectral content of the x-ray beam, then the quality of the reconstruction may be lacking.

As discussed above, the tomographic imaging processes disclosed herein includes determining a simplified forward projection model to implement in an iterative reconstruction scheme. The determination of the simplification may include performing a dual energy iterative reconstruction, where the two energies can be down-sampled low-energy data obtained from a low-energy, high resolution scan, and low-resolution data. The low resolution data may be obtained from a separate high-energy scan, or based on variance data of the low-energy, high resolution scan. Intermediate values obtained from the dual-energy iterative reconstruction may be used to determine average sample parameters, such as density $\rho$ and atomic number Z. Additionally, spectrum information of the x-ray source 102 along with an attenuation estimate may be used to determine the best simplification to implement. Once a simplification has been determined, a single energy iterative scheme will be performed using the simplification to produce a beam hardened corrected (BHC) tomographic reconstruction.

The forward projection(s) implemented in the iterative reconstruction scheme may be the full AM model or simplified versions as determined herein. The AM model, as noted, is implemented due to the model accounting for the main mechanisms of x-ray attenuation and further because it is amenable to scaling over the spectrum of the source 102. With regards to implementation, the system 100 may perform a low-energy, high resolution scan of the sample 110 to perform one or more reconstructions of the sample. To eliminate beam hardening artefacts, the system 100 may perform an iterative scheme using a simplification to the AM model to provide beam hardened corrected (BHC) reconstructions of the sample 110. Due to the simplification, only scan data at a single energy, the low-energy high-resolution scan data for example, is needed to calculate the reconstruction. However, as will be discussed in more detail below, the various other parameters and initial determinations of the best simplification to implement may also be determined. It should be noted, though, that the various other parameters and initial determination of which simplification to implement may not be necessary, and instead an initial guess may substitute for the additional algorithms.

For example, a guess at a simplification, such as attributing all attenuation to the Photoelectric effect, may be made and the associated simplification of the AM model implemented in the single energy iterative scheme. Additional initial estimates for volume attenuation may also be made at the outset, but this estimate will be improved as the algorithm converges on the measure data. Also relevant is the back projection operation implemented in the iterative scheme. As noted, it is conventional to implement an adjoint back projection in such iterative schemes, but doing so even for a simplified AM model may be computationally burdensome. As such, a simple back projection at a single energy averaged over the sample may be substituted, which breaks the adjoint relationship. However, this change has proven to provide the desired BHC reconstructions with low computational overhead. The various algorithms and iterative schemes will be discussed in more detail below.

Figure 2:
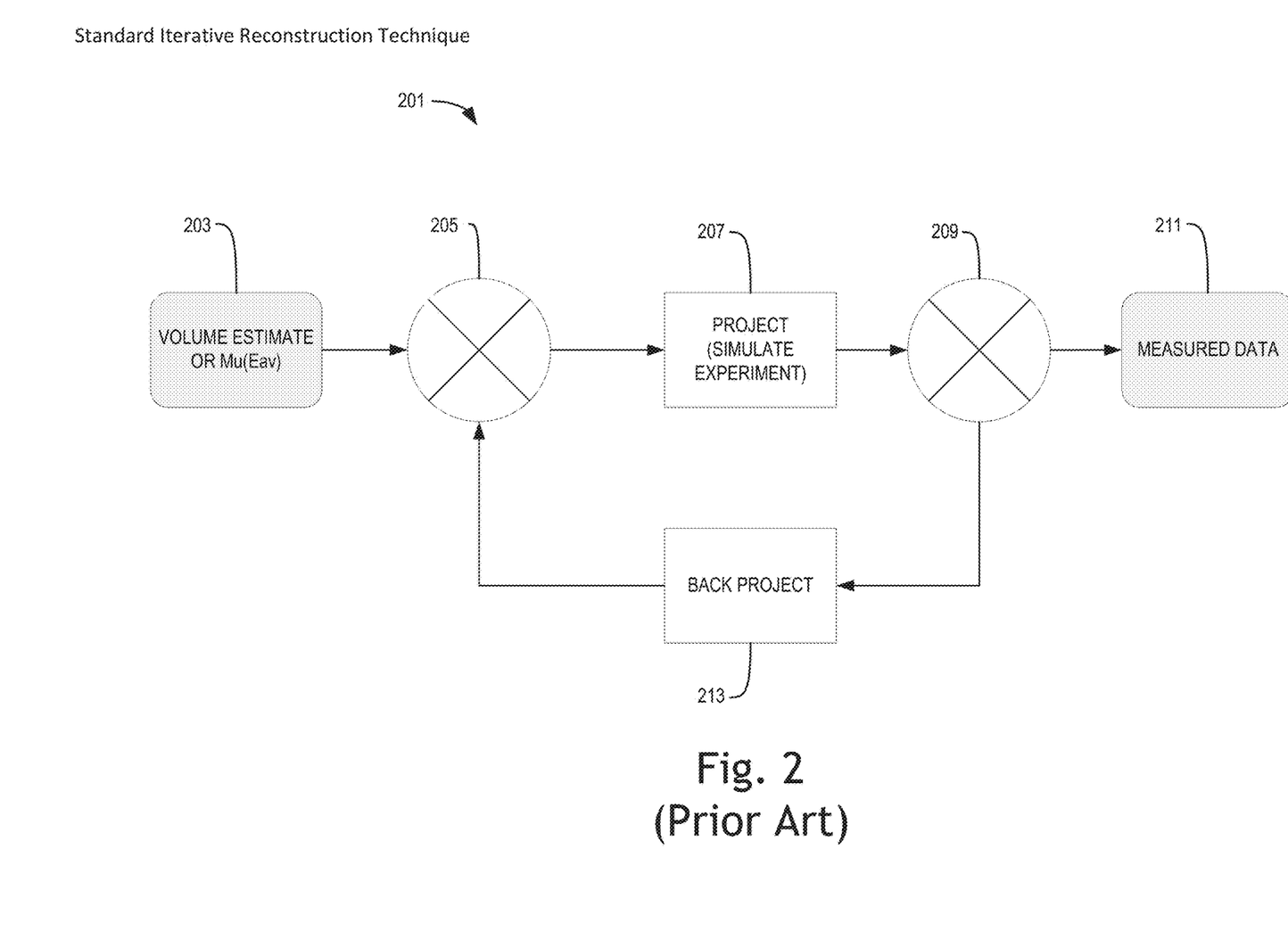
FIG. 2 is an example flow diagram of a method for iterative reconstruction.

FIG. 2 is an example flow diagram of a method 201. The method 201 illustrates an iterative reconstruction technique as known in the art. The method 201 may begin at combiner 205, which combines either a volume estimate or an average attenuation estimate from block 203 with an output of back projection 213. The combination of the data may be performed through either addition or multiplication. Initially, the output of back projection 213 may be zero, and the value of 203 is provided to forward projection 207, which projects the value of 203 to simulate the experiment, i.e., to simulate the x-ray attenuation of a sample. The output of 207, i.e., the simulation of the experiment, is provided to combiner 209, which compares the results of the simulation with the measured data 211. The comparison may be performed by either subtraction or division, and may be the reverse of the process performed by combiner 205. The result of combiner 209 is provided to back projection 213, which performs a back projection. The back projection may desirably be an adjoint back projection, i.e., the reverse operation as performed in forward projection 207. The back projection essentially back projects the difference data to simulate the source used to obtain the measured data. The output of back projection 213 is provided to combiner 205 to be combined with the initial estimate, i.e., the data of 203. The combined data then completes another iteration of the method 201. The method 201 may be iterated until convergence of the simulated data and the measured data is obtained.

Iterative reconstruction methods seek to produce successively better estimates of a volume which when projected maximizes the likelihood that the measured data is of this estimate. The estimates are improved upon in each iteration by calculating a difference (not necessarily by subtraction) between the projection of the estimate and the measured data, and propagating it back to the volume space to give an improved estimate for the next iteration. The procedure of any iterative reconstruction techniques is generalized in Algorithm 1 (see below). The method takes as its input a measured data y, and returns the reconstructed volume x. The framework of the four operations (lines 4-7) is typically the same for all iterative methods, and the differences reside in the selection and implementation of these four functions. The selection of the difference function is paired with the combination function, which are usually an/a (addition, subtraction) or a (multiplication, division) pair. And likewise the back projection function is paired with the projection function, which is typically the adjoint of the projection function.

| | |
|---|---|
| 1: procedure Iterative(y,n) | ◆ Iterative reconstruction of scan y with n iterations |
| 2: x ← Initialize( ) | ◆ Select a starting value for estimate |
| 3: for I = 1, 2, 3 ... n do | |
| 4:    p ← P(x) | ◆ Project current estimate |
| 5:    Δ ← d(p,y) | ◆ Calculate difference between projected estimate and scan |
| 6:    r ← B(Δ) | ◆ Back project the difference |
| 7:    x ← a(r,x) | ◆ Combine with x |
| 8:    end for | |
| 9: end procedure | |

In some embodiments, the AM model may be implemented in the forward projection 207. However, since the AM model has at least two variables, multiple scans and/or separate iterations of the method 201 at different energies may be required to fully solve the AM model. Additionally, the adjoint back projection of the AM model may further complicate the implementation of the method 201.

Figure 3:
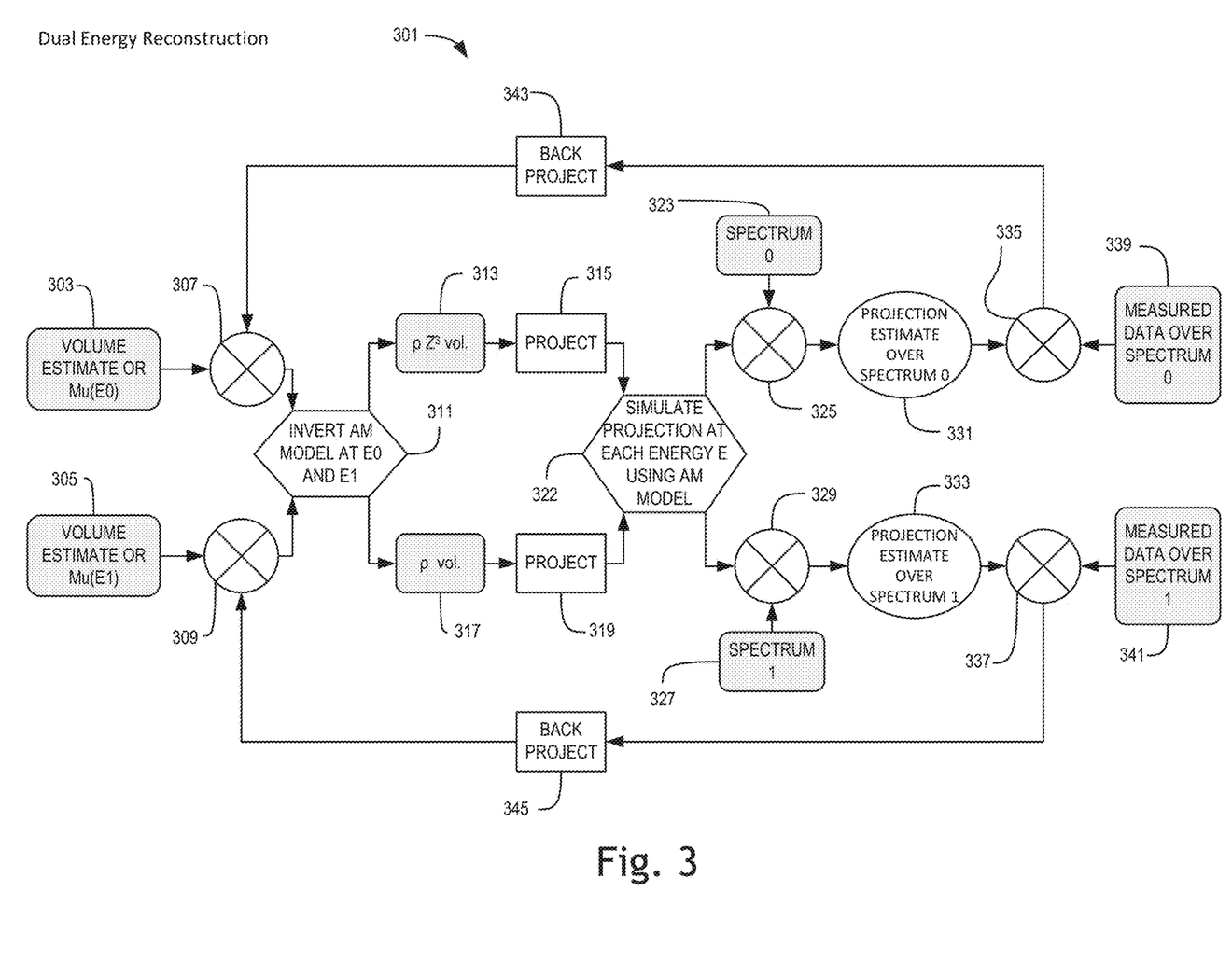
FIG. 3 is an example of a dual energy iterative reconstruction method using the Alvarez-Macovski (AM) model in accordance with an embodiment of the present disclosure.

FIG. 3 is an example of a dual energy iterative reconstruction method 301 using the AM model in accordance with an embodiment of the present disclosure. The method 301 may provide reconstructions of a sample using measured data at two different source energies and further weighted by a spectrum associated with each of those source energies. The method 301 may follow Algorithm 1 discussed above with changes made to the forward projection, the addition of a second source energy, and a non-adjoint back projection. The end result, however, may be a beam hardened corrected (BHC) reconstruction of a sample.

While the dual energy iterative reconstruction may be used to implement the full AM model, such implementation requires data from two low-energy, high-resolution scans, which may require additional scan time, additional computing overhead, and a more complicated back projection. However, the dual energy iteration reconstruction may use data from a high-resolution, low energy scan in combination with low-resolution data, which may take less time to obtain. The low-resolution data may be obtained from a high-energy scan, e.g., a scan using high energy x-rays that are essentially pre-hardened, or low-resolution variance data. In either case, an x-ray spectrum for both scans will be used for scaling the forward projections to account for the spectral content of the x-ray beam(s). Although the reconstruction from performing the dual energy iteration reconstruction may be obtained, they obtained reconstructions may not be fully beam hardened corrected due to using low-resolution data or the variance data. However, intermediate parameters obtained from the dual energy reconstruction, such as $\rho Z^3$ and $\rho$, may be used in other methods disclosed herein to determine average parameter values and a simplification to make to the AM model to obtain a BHC reconstruction of a sample.

The method 301 may begin with starting estimates 303 and 305, which include values for volume estimates or attenuation estimates of the sample at respective source energies $E_0$ and $E_1$. The starting values in blocks 303, 305 are provided to combiners 307, 309, respectively, which either add or multiply data from back projections 343 and 345, respectively. Initially, the combiners 307 and 309 may not receive data from back projections 343, 345 to combine with the estimates in blocks 303 and 305, but subsequent iterations of the method 301 will include combining data from back projection boxes 343, 345. Outputs of combiners 307 and 309 are provided to process block 311, which performs an inverse AM model calculation at energies $E_0$ and $E_1$. The inverse AM model may be an inverse of equation 4, for example. Based on the input data, process block 311 will determine a value for density ($\rho$) and atomic number (Z) for the sample. The values for both $\rho$ and Z, which may be referred to as intermediate sample parameters, are provided to block 313, and the value for $\rho$ is provided to block 317. Block 313 determines a value for $\rho*Z^3$, which is used in the Photoelectic effect term of the AM model, while block 317 stores the value for $\rho$, which is used in the Compton Scattering term of the AM model.

The values of $\rho Z^3$ and $\rho$ are separately projected using the AM model (Equation 4) in forward projection blocks 315 and 319, respectively, and the separate projections are combined to simulate the projection at each energy E using the AM model in process block 321. The result of process block 321 is provided to both combiners 325 and 329, where they are weighted by spectrums 0 and 1, respectively, from 323 and 327. The spectrums 0 and 1 are associated with source energies $E_0$ and $E_1$, respectively, and which may be measured using the system 100 without a sample in the chamber. The output of the combiners 325, 329 provide projection estimates over spectrums 0 and 1, respectively, using the AM model, as noted in blocks 331 and 333. These estimates are then respectively provided to combiners 335 and 337, which compare the estimates to the measured data over the same spectrums 0 and 1. The combiners 335 and 337 may perform the reverse operation as performed by combiners 307 and 309, respectively, as noted above. The difference, or residual, of the comparisons are then respectively provided to back projections 343 and 345, which perform a non-adjoint back projection. The non-adjoint back projections may include a simple back projection at a single energy and not over the respective spectrums 0 and 1. The output of the back projections 343 and 345 are then provided to combiners 307 and 309, respectively, so that another iteration of the method 301 may occur. The method 301 may continue to iterate until convergence is acquired.

A typical iterative scheme, as summarized in Algorithm 1, takes the form of, for example, FIGS. 2 and 3. Here, the projection operator is represented by an integral along line L, applied to the attenuation coefficient of the object, μ, as follows:

$$P(\mu)(L) = \int_L \mu(s) ds. \tag{5}$$

This is converted to intensity through the Beer-Lambert law, which becomes $$I(L) = I_0 e^{-P(\mu)(L)}. \tag{6}$$

To apply the beam-hardening correction, this monochromatic intensity calculation must be replaced with a polychromatic form as follows:

$$I(L) = I_0 \Sigma S(E) e^{-P(\mu(E))(L)}, \text{ where the summation is over } E. \tag{7}$$

Here μ(E) is the attenuation at energy E given by the AM model. The projection of the attenuation at each energy is obtained, converted into intensity, and weighed by the spectrum intensity of that energy S(E)—see blocks 315, 319 through 325, 329 of method 301 for example. The sum of these over all energies E gives the final intensity along line L. From Eq. (7) it seems that the projection operator must be applied at each energy E. This may not be necessary in practice, however, if the relevant material properties are projected separately (see blocks 313 to 315, and 317 to 319), then projected attenuations at each energy can be obtained from this through simple addition and scaling operations. In terms of simplifying the AM model, one simplification requires only one projection and scaling by a factor of $1/E^3$ (Photoelectric effect only), while the other (Z proportional to $\rho$) requires two projections, with the scaling factor of $1/E^3$ and $f_{KN}(E)$ required.

More saliently, utilizing the full AM model can only be carried out with enough information provided by scans at two energies. Yet, simplifications are therefore desirable. There is also the question of a basis energy $E_0$ from which we can scale our attenuation to obtain the attenuations at all energies.

The AM model provides the necessary information of x-ray attenuation as a function of x-ray energy, and the material properties of atomic number (Z), atomic weight (A), and electron density ($\rho$). The model includes Compton scattering and the Photoelectric effect. Assuming A=2Z, reduces this to two variables. In scans of samples composed of a single material where such properties can be provided, the AM model can be applied directly in the reconstruction algorithm. However, this somewhat limits the application of the model, especially when the primary purpose of tomography is to determine the identity of a scan containing several unknown materials, where the density and effective atomic number are not only unknown, but can vary from pixel to pixel. Methods are needed to somehow separate these material properties during reconstruction. Fundamentally this is an ill-posed problem. The tomogram provides only a single quantity of information, which is the attenuation coefficient per pixel, from which we have insufficient data to deduce the two components of attenuation. This stems from the fact that the density and atomic number of a material are independent quantities. Therefore, a certain degree of guesswork is required to extract the necessary values to carry out the full AM model.

One technique disclosed herein, i.e., simplification of the AM model, includes a simple relationship between the two quantities: a linear relationship between Z and $\rho$, e.g., Z=c$\rho$. Although this simplification provides a way to model the physical attenuation process with polychromatic radiation in an iterative scheme, the degree of its practicality remains a question. Since the photoelectric absorption and Compton scattering contributions to attenuation need to be calculated and then projected and back-projected separately; this inevitably adds to the complexity of the algorithm. However, by relaxing requirements for an adjoint back projection operation and assuming simple relationships in the material properties, the algorithm may be simplified significantly.

Figure 4:
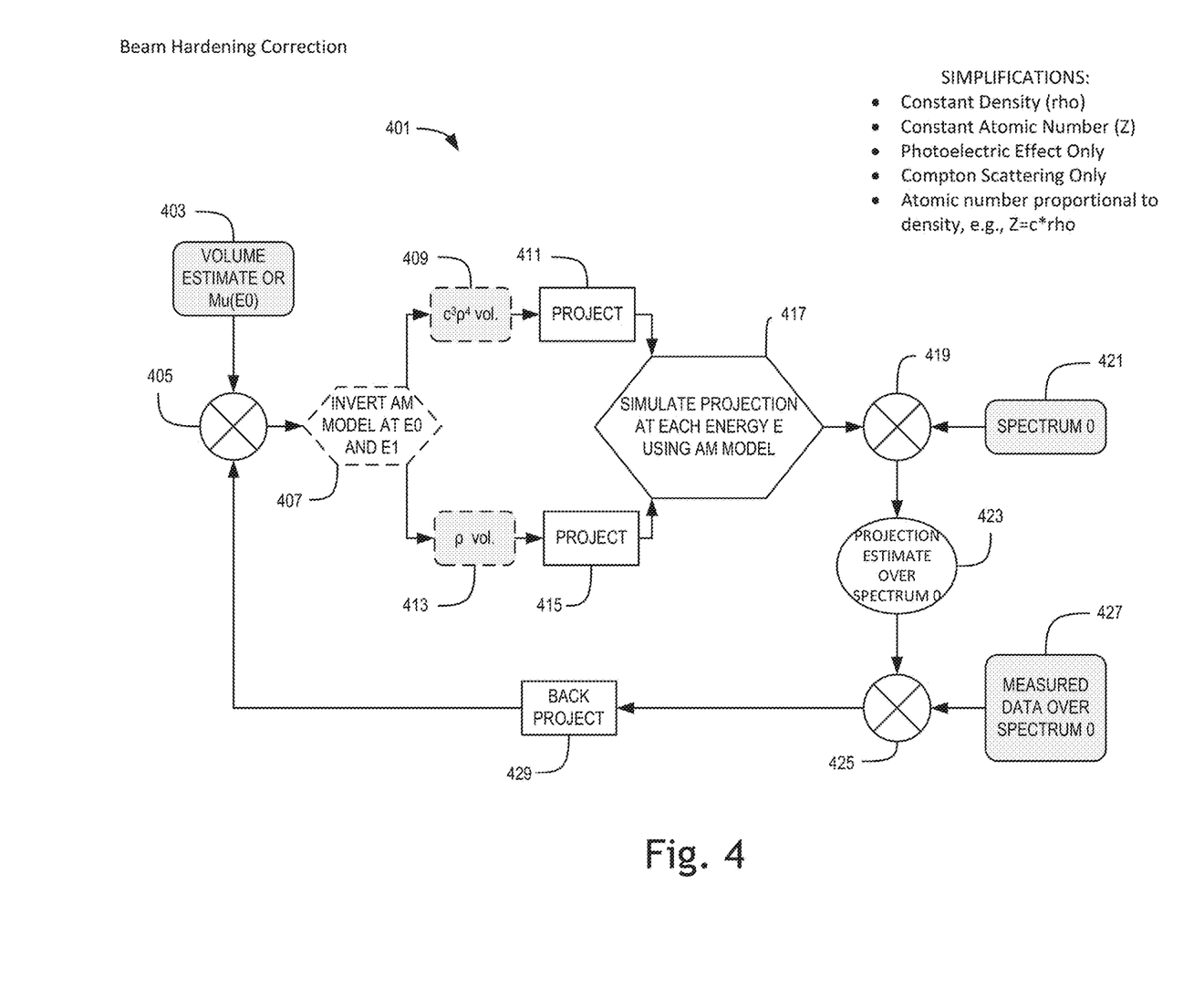
FIG. 4 is an example method for implementing tomographic reconstruction using a simplified AM model to obtain beam hardened corrected reconstructions in accordance with an embodiment of the present disclosure.

FIG. 4 is an example method 401 for implementing tomographic reconstruction using a simplified AM model to obtain beam hardened corrected reconstructions in accordance with an embodiment of the present disclosure. The method 401 implements one of a variety of simplifications to the AM model so that the beam hardened corrected reconstructions may be obtained from a scan at a single energy instead of scans at two energies. The method 401 is a simplification of the method 301, and includes a simplification of the AM model, which in turn determines the variables used performing the method 401. For example, if the simplification is to use only the Photoelectric Effect portion of the AM model, then optional process blocks 407, 409 and 413 may be omitted. It should be noted that the optional process blocks may only be needed when the simplification results in setting Z proportional to $\rho$, which requires calculation of values for $c^3\rho^4$ and $\rho$. In some embodiments, the method 401 may be performed using initial guesses for values to include in block 403, and, if needed, block 409 and 413 and randomly selecting a simplification of the AM model to implement, such as the proportionality simplification or the Photoelectric effect only simplification. However, in other embodiments, prior to performing method 401, methods 301, 501 and 601 may be performed to determine initial values for c, $\rho$, and Z, and to further determine which simplification may be best to implement in method 401. It should be noted, that both workflows are contemplated herein and the initial determination of c, $\rho$, Z and the simplification is not necessary to the technique disclosed herein, which is to simplify the AM model for forward projections and use a non-adjoint back projection in an iterative scheme.

As with methods 201 and 301, the method 401 may begin at combiner 405, which combines the initial values from 403 with an output of back projection 429. Initially, however, the output of back projection 429 may be zero. The combination performed by combiner 405 may be addition or multiplication. Depending on the simplification, as noted above, the output of combiner 405 may go directly to process block 417, or to process block 407. For example, if the simplification is based on constant density, constant atomic number, Photoelectric Effect only, or Compton scattering only, then the output of process block 405 is provided to process block 417. On the other hand, of the simplification is to set atomic number proportional to density, then the output of combiner 405 is provided to process block 407.

Because method 401 is a simplified version of method 301, the details of the flow will not be discussed for sake of brevity. However, the impact of the simplifications and how they may be implemented will be discussed. It should also be reiterated that the back projection performed in back projection 429 is a non-adjoint projection, e.g., it is not the reverse of the projection performed in process block 411 and/or 417. In general, a family of algorithms is proposed to determine a tomogram mapping attenuation at a single X-ray energy. The algorithms are generated by various simplifications of the AM model (to reduce it from two material properties to a single variable) combined with some maximum likelihood iterative reconstruction method. In all of the simplifications, the desire is to produce a forward model that more accurately simulates the physical data measurement, while the back-projection operation is unaltered from the typical back-projection operation that assumes "monochromatic" radiation.

One simplification is to assume that density $\rho$ is constant, which may be useful in distinguishing different materials of similar density in a sample, such as biological samples with contrast agents absorbed by various tissues of the sample. The effective selection of a constant density $\rho$ value is an important issue in the implementation of this simplification.

Another simplification is to assume that atomic number Z is constant, which may be applicable when the sample is composed of a single material, but with varying degrees of porosity (e.g., density). Energy scaling in this simplification takes into account both the Photoelectric effect and Compton scattering, and may require only one projection operation per iteration due to the simplification. The selection of the value of Z may be made based on a priori knowledge.

Another simplification is to assume that all attenuation is entirely due to the Photoelectric effect. Although this approach may appear as a vast simplification, the simplification produces effective qualitative corrections on beam-hardening artefacts since most of the inconsistencies occur at low energies, where Photoelectric absorption dominates the attenuation. The simplification includes a 1/E3 scaling of the Photoelectric effect, which means the difference in attenuation between two different energies is much more pronounced in the Photoelectric portion of the AM model when compared to the $f_{KN}(E)$ scaling of the Compton scattering portion of the model. The scaling may emphasize the sensitivity of the Photoelectric effect portion of the AM model to the spectrum of the probing X-rays and the effect of beam hardening. An additional benefit may be that this requires only one projection operation per iteration of the method 401.

A fourth simplification is to assume that all attenuation is entirely due to Compton scattering, which may be a reverse of the Photoelectric effect only simplification, and may ignore the Photoelectric effect only. This simplification may be less applicable than the others listed herein but is included to provide a full discussion of the available simplifications. This simplification may be used for tomography that uses X-rays of very hard spectra, e.g., high energy only, and/or samples composed of entirely of very light elements. The implementation of this simplification may also only require a single projection operation per iteration of the method 401.

The final simplification is to assume that atomic number Z is proportional to density ρ. For example, Z may be proportional to cρ, c being a constant of proportionality. An example for c may be around 4.88, which provides a reasonable model for materials near the middle of the periodic table. Instead of positing a relationship between the Photoelectric effect and Compton scattering components of the AM model, the proposed relationship is between the Photoelectric effect and Compton scattering coefficients $\rho Z^3 = c^3 \rho^4$ and ρ respectively. Note that for this assumption, two projection operations are required in the forward model: one for $\rho^4$ and one for ρ since $\int_L \rho(x)^4 ds \neq (\int_L \rho(x) ds)^4$.

To further illustrate, the above simplifications will be discussed in additional detail with regards to the AM model and their implementation in at least method 401. These simplifications are used to modify the forward model in each of the iterative schemes. Of course, changing the forward model only will break the adjoint relation with the reverse operation (back-projection in this case) which conventionally provides rapid convergence. It has been observed that, despite this theoretical incompatibility, all of these methods behaved robustly with simulated polychromatic scans and converged with reasonable speed.

Atomic Number Proportional to Density

Simplifying the full AM model based on setting Z=cρ results in the following:

$$\mu(E) = \frac{K_1}{E^3} c^3 \rho^4 + K_2 f_{KN}(E)\rho \qquad (8)$$

And scaling becomes $$P(\mu(E))(L) = K_1 \frac{E_0^3}{E^3} c^3 P(\rho^4)(L) + K_2 \frac{f_{KN}(E)}{f_{KN}(E_0)} P(\rho)(L), \qquad (9)$$

which may require additional steps compared to the other simplifications, such as the Photoelectric effect only simplification. First, for every pixel ρ will need to be solved for using equation (8). Subsequently, the projection of both ρ and $\rho^4$ will be performed. The energy scaling is performed after the projection due to the scaling being linear with respect to the two components—ρ and $\rho^4$, but not linear with respect to μ. In summary, (a) Solve the simplified AM equation to obtain the ρ value at each pixel, which provides ρ and $\rho^4$;
(b) Project ρ;
(c) Project $\rho^4$;
(d) Obtain the projected attenuation for each energy from equation (9) and the projection data P(ρ) and P($\rho^4$); and
(e) Convert the projected attenuation to intensity and combine after weighting by the spectrum in equation (7)

Attenuation is Entirely Due to Photoelectric Effect

The Photoelectric effect only simplification ignores the Compton scattering component of the AM model, and results in the following $$\mu(E) = K_1' \cdot \frac{1}{E^3} \qquad (10)$$

where $K_1'$ is the combination of all constants, and scaling becomes $$P(\mu(E))(L) = \frac{E_0^3}{E^3} P(\mu(E_0))(L). \qquad (11)$$

Note that scaling is done after the projection operation. This is possible because the attenuation for all materials lie on the same $1/E^3$ curve, so to obtain the projected attenuation at another energy, all the different materials inside each pixel in the projection are scaled equally. The projection operation can therefore be summarized exactly by the following (a) Project the current estimate of attenuation coefficient values; assume it is at energy $E_0$;
(b) Scale projected attenuation at $E_0$ by equation (11) to obtain the projected attenuation at each energy; and
(c) Convert the projected attenuation into intensity and combine after weighting by the spectrum as in equation (7).

Attenuation is Entirely Due to Compton Scattering

This simplification is similar to the above Photoelectric effect only simplification. However, this only includes the Compton scattering component of the AM model. This is markedly less useful since the attenuation due to Photoelectric effect varies the most and is therefore responsible for most of the beam hardening artefacts. Implementing this simplification results in the following reduced AM model $$\mu(E) = \left(\frac{Z}{A} K_1(\rho) f_{KN}(E)\right) \qquad (12)$$

On scaling, the proportion would be $$P(\mu(E))(L) = P(\mu(E_0)) \cdot \frac{f_{KN}(E)}{f_{KN}(E_0)} \qquad (13)$$

The projection operation would be the same as in the above as well.

Atomic Number is Constant Throughout the Sample

If the effective atomic number Z is assumed to be roughly constant throughout the sample then density ρ becomes the only variable, and a predetermined Z suffices for the entire image as a result. The AM model, based on this simplification, reduces to $$\mu(E) = \frac{Z}{A}\rho\left(K_1\frac{Z^3}{E^3} + K_2 f_{KN}(E)\right) \quad (14)$$

Applying the scaling algorithm after the projection operation by the following scaling with respect to constant becomes $$P(\mu(E))(L) = P(\mu(E_0))\frac{K_1\frac{Z^3}{E^3} + K_2 f_{KN}(E)}{K_1\frac{Z^3}{E_0^3} + K_2 f_{KN}(E_0)}(L) \quad (15)$$

Density is Constant Throughout the Sample

If the density is assumed to be roughly constant throughout the sample, the density of the volume of space outside of the sample may need to be taken into account. While this may complicate the method, accounting for this difference is fairly straight forward. Here, there are two values density can assume, $\rho$ inside the specimen and 0 gm/cm$^3$ outside the specimen. However, we note that $P(\rho Z^3) = \rho P(Z^3)$ and $P(\rho) = \rho P(B)$ where B is the binary segmentation of the volume. $Z^3$ may be found from volume $\mu(E_0)$ as follows:

$$Z^3 = \max\left((\mu(E_0) - K_2\rho f_{KN}(E_0))\frac{E_0^3}{K_1\rho}, 0\right) \quad (16)$$

B can be computed from this volume by defining it as 1 if $Z^3>0$, 0 otherwise. The projected attenuation of the specimen at any energy E may then be computed as $$P(\mu(E))(L) = K_1\rho P(Z^3)(L)\cdot\frac{1}{E_0^3} + K_1\rho P(B)(L) f_{KN}(E). \quad (17)$$

It should be noted that the segmented volume B is unlikely to vary much with subsequent iterations and P(B) may be computed in a first iteration, then stored for re-use in all subsequent iterations.

It may need to be restated that the forward operation is no longer linear, and the conventional notion of an adjoint operation, which is only possible in a linear matrix multiplication context, breaks down. However, we are still able to create a pseudo-adjoint operation which adheres to the concept of adjoint operations, and maintains the consistency of working with monochromatic data in volume space, and polychromatic data in intensity/attenuation space. These methods are obtained empirically, especially when it comes to finding suitable normalization factors that conserve mass, (or the sum of the attenuation values of a volume space image), across iterations. Since each reverse operation is paired with its forward model, we require five corresponding pseudo-adjoint operations, i.e., one for each assumption discussed above. For each forward model, there are two reverse operations available: an unmodified back-projection as in the monochromatic case; and an empirically obtained pseudo-adjoint back-projection descent. While at least these two operations are available, the unmodified back projection, which breaks the adjoint relationship with the forward projection, will be discussed herein.

Figure 5:
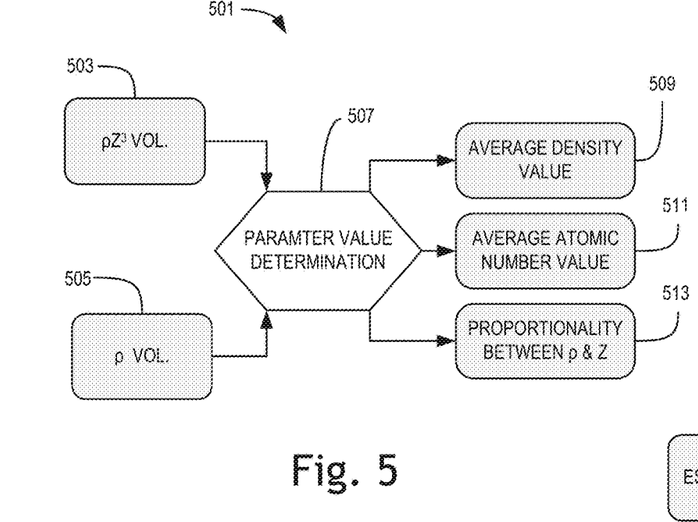
FIG. 5 is an example method for estimating parameter values in accordance with an embodiment of the present disclosure.

FIG. 5 is an example method 501 for estimating parameter values in accordance with an embodiment of the present disclosure. The estimated parameters may subsequently be used in the other methods disclosed herein, and to further determine what simplification to implement in a given reconstruction. The determination of the simplification will be discussed with regards to FIG. 6. Once the parameters are estimated and the simplification is determined, the method 401 may be performed using the determined simplification. All the methods may be performed by the system 100, for example.

Figure 7:
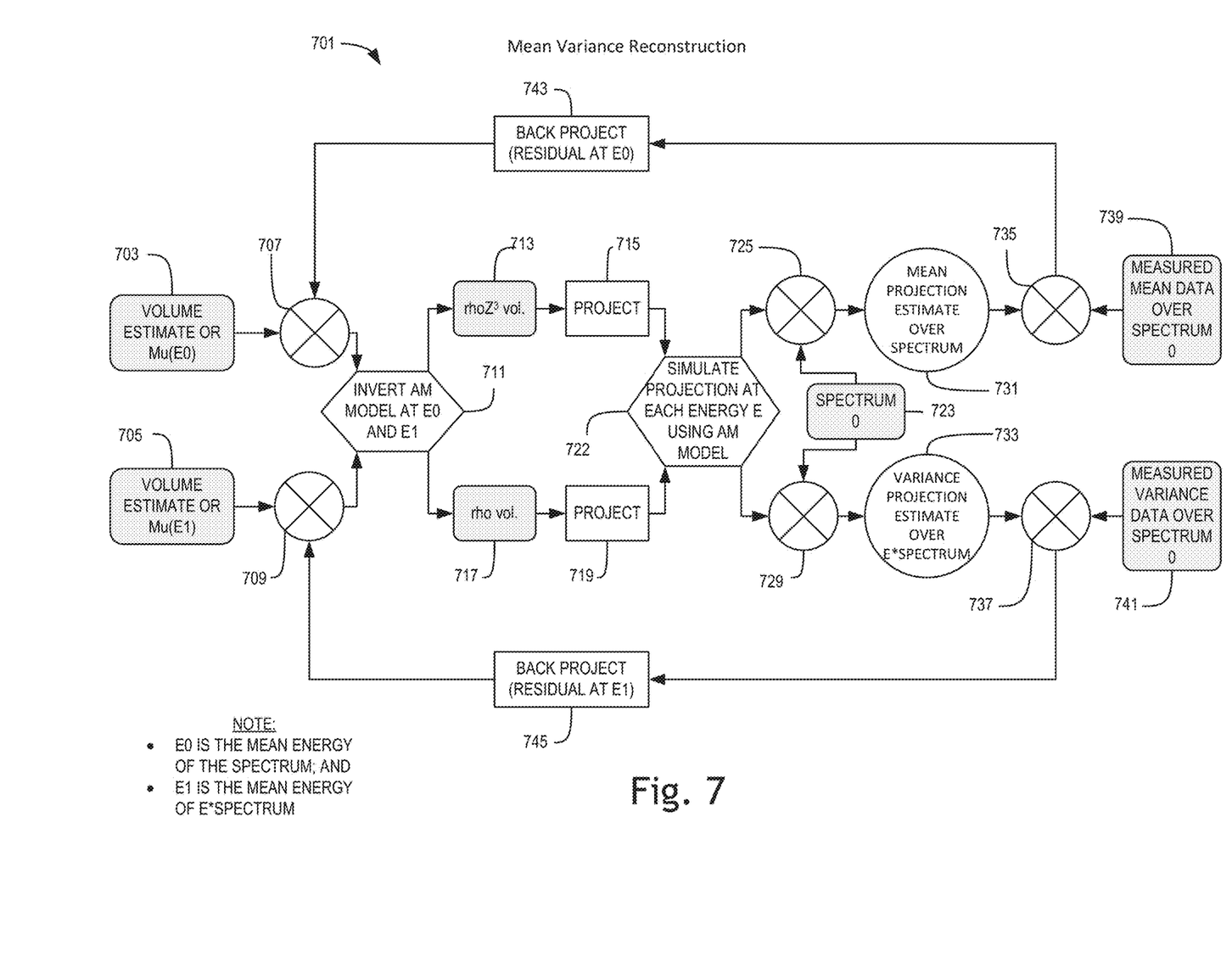
FIG. 7 is an example of a dual energy method using variance data in accordance with an embodiment of the present disclosure.

The inputs $\rho Z3$ and $\rho$ may be obtained from performing the dual energy method 301 using down-sampled low energy data combined with data from a low-resolution scan, data from a high-energy scan or variance data (see FIG. 7 for the variance data based method). The intermediate parameters from process blocks 313 and 317 provide the initial inputs for method 501, respectively. The intermediate values may be used by method 501 once method 301 converges using the down-sampled low energy data combined with data from a low-resolution scan, data from a high-energy scan or variance data.

The parameter value determination determines an average density $\rho$, an average atomic number Z, and the constant of proportionality c used in Z=c$\rho$. The average density is provided by process block 509 may be the average value for density found for the sample. The average atomic number Z may be found as the average value of $$Z_{avg} = \sqrt[3]{\frac{\rho Z^3}{\rho}}$$

in the sample. And the constant of proportionality c is found with the following equation again averaged over the entire sample $$c = \sqrt[3]{\frac{\rho Z^3}{\rho^4}}.$$

Figure 6:
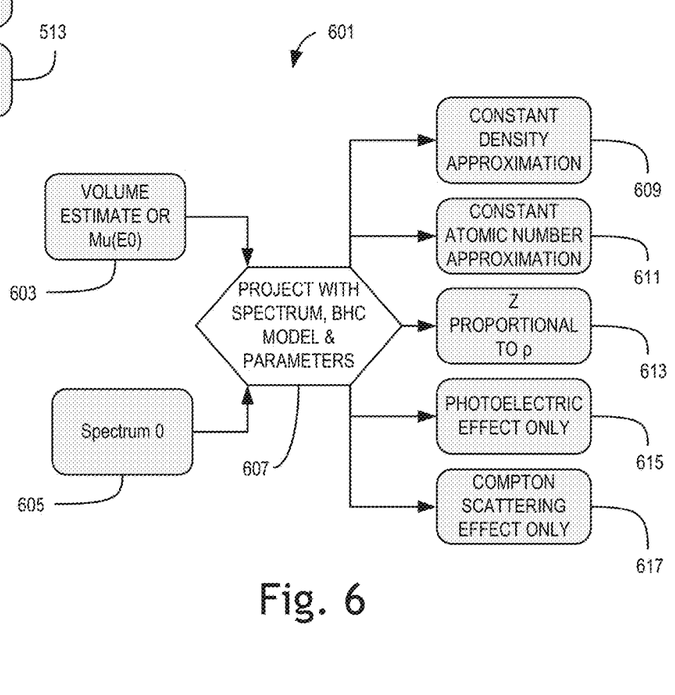
FIG. 6 is an example method for determining which simplification should be implemented in method of FIG. 4 in accordance with an embodiment of the present disclosure.

FIG. 6 is an example method 601 for determining which simplification should be implemented in method 301 in accordance with an embodiment of the present disclosure. The method 601 includes performing projections using all of the simplifications based on an initial estimate and the spectrum at energy $E_0$ then comparing the projected data with measured data at $E_0$. For example, the initial estimate is provided in block 603 and the spectrum information is provided in block 605, which are both provided to process block 607. In process block 607, a projection is performed using the data from block 603 and 605 for each of the simplifications discussed herein with the outputs provided to a corresponding block 609 through 617. The outputs in the blocks 609 through 617 are then compared to the outcome of dual energy method 301 using low energy data. The simplification that is closest to the outcome of the dual energy method is then selected for implementing in method 401.

FIG. 7 is an example of a dual energy method 701 using variance data in accordance with an embodiment of the present disclosure. The method 701 may be similar to the method 301 except for $E_0$, $E_1$, and spectrum 0. The method 701 replaces the high-energy low resolution scan data to perform a dual energy iterative scheme and instead uses a variance of low-energy data at spectrum 0. It should be noted that the variance data is equivalent to attenuation data obtained with the spectrum scaled by X-ray energy $E_0$, e.g., skewed to higher energies. As such, the variance data may be used in place of the high-energy scan.

Figure 8:
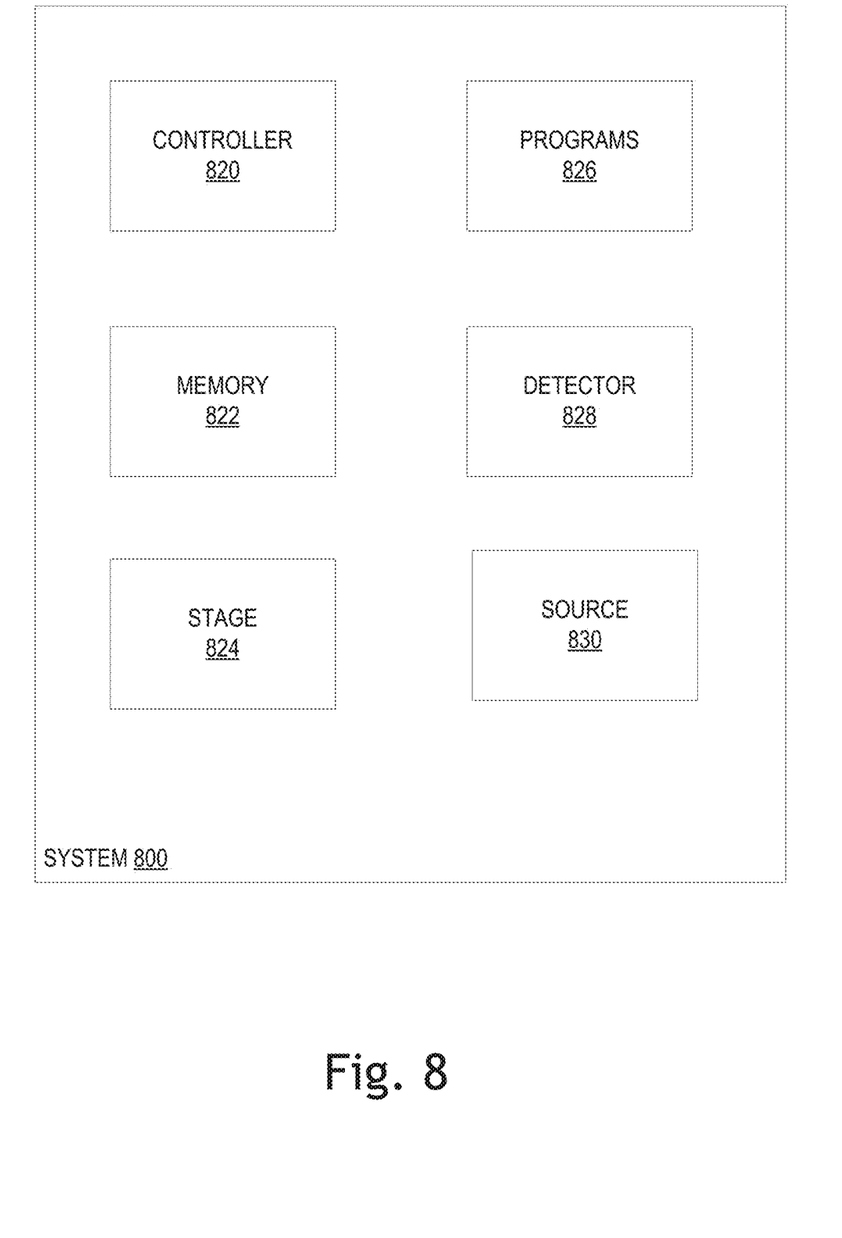
FIG. 8 is an example functional block diagram of a CT system in accordance with an embodiment of the present disclosure.

FIG. 8 is an example functional block diagram of a CT system 800 in accordance with an embodiment of the present disclosure. The CT system 800 may be an example of the CT system 100, and may be used to obtain CT scans of samples and provide BHC reconstructions of a sample, such as the sample 110. The CT system 800 may at least include a controller 820, memory 822, stage 824, programs 826, detector 828, and source 830. In general, the CT system 800 may generate tomographic reconstructions of samples as described herein.

The controller 820 may be a micro controller, a CPU, one or more computing cores, or the like. The controller 820 may control multiple aspects of the CT system 800 and may be coupled to receive data from and provide control signals to the various other components of the CT system 800. For example, the controller 820 may execute code stored in programs 826 to cause the CT system 800 to perform low and high resolutions scans of a sample. Additionally, scan data obtained by the detector 828 may be provided to the controller 820. In response, the controller 820 may perform an array of algorithms, such as illustrated by methods 201 through 701, on the data to provide reconstructions, which may be beam hardened corrected. The algorithms, as noted, may be part of the programs 826.

The memory 822 may be volatile or non-volatile memory coupled to hold data and instructions. The programs 826, which may be a portion of the memory 822, may include operating instructions and code for performing the various tasks of the CT system 800, such as controlling a stage, a source, and a detector, along with various other ancillary components.

The stage 824 may support the sample and provide movement thereof in response to control signals provided by the controller 820. The control signals may be generated by the controller 820 while executing stage control instructions stored in memory 822 and/or programs 826. For example, the stage control may cause the stage to move in accordance to a desired trajectory, such as a helix or a zig zag pattern, for example.

The detector 828 may detect x-rays having passed through the sample and record their intensity. The intensity of the x-rays may be reduced due to attenuation from passing through the sample. The amount of attenuation may be the data used to image the sample and for generating reconstructions. The image data, or scan data, may be provided to the controller 820 for processing, or stored in memory 822 for later processing. Additionally, the detector 828 may be moved in response to control signals from the controller 820. The detector 828 may be adjusted to account for sample shape, size, or to obtain a desired field of view (FOV).

The source 830 provides the x-rays to the sample and may be controlled by the controller 820. For example, the source 830, in response to control signals from the controller 820, may generate x-rays at a desired intensity and may also move in a direction with respect to the sample. The source 830 may be adjusted to account for sample shape, size, or to obtain the desired (FOV).

Many modifications will be apparent to those skilled in the art without departing from the scope of the present invention.

Figure 9:
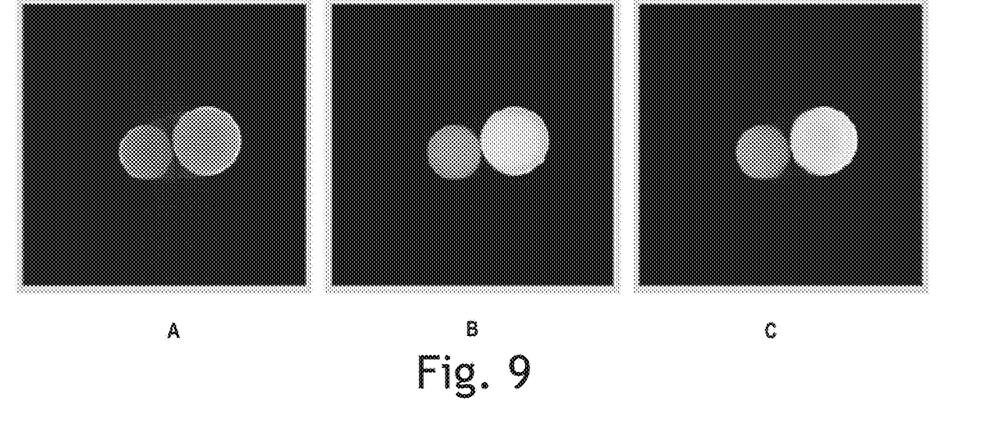
FIGS. 9 and 10 illustrate reconstructions using the techniques disclosed herein along with a non-beam hardened corrected example reconstruction.
Figure 10:
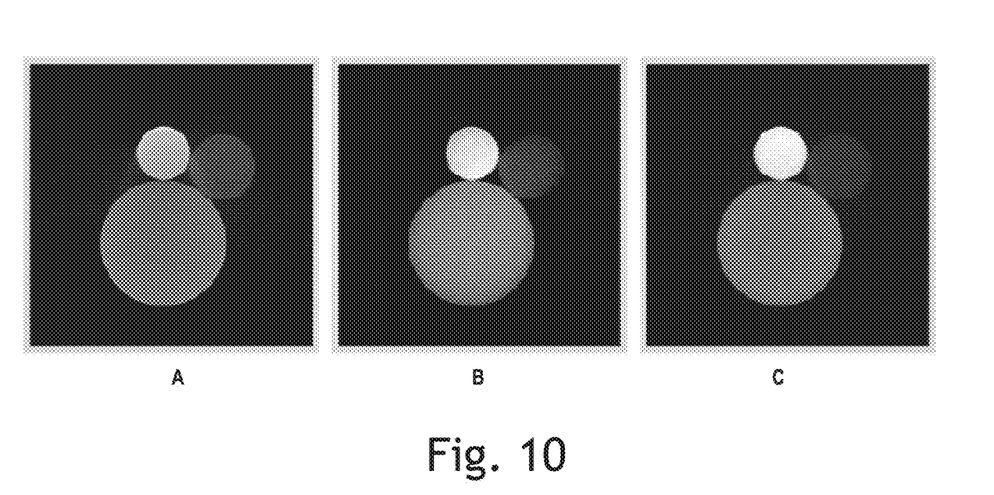

FIGS. 9 and 10 illustrate reconstructions using the techniques disclosed herein along with a non-beam hardened corrected example reconstruction. FIG. 9 includes a tomographic reconstructions of an aluminum and a marble rod, the aluminum on the left. Image A is an uncorrected reconstruction, which shows the cupping (brighter edges) and streaking (shadow area between the two rods) artefacts. Image B is a BHC reconstruction of the same using the Photoelectric effect simplification, whereas image C is a BHC reconstruction using the density proportional to atomic number simplification. As can be seen, both simplifications improve the reconstructions. However, the Photoelectric effect simplification, at least by eye, appears to produce less streaking with only a slight improvement in cupping. On the other hand, the proportionality simplification appears to include some streaking but less cupping. Yet, both BHC reconstructions include improved contrast between the two rods, which leads to improvement in material identification.

FIG. 10 is the same sequence of images, but the images include a Teflon rod (bottom), a glass rod (top), and an acrylic rod (top right). Again, both simplifications improve image quality and reduce artefacts with varying degrees of improvement.

The embodiments discussed herein to illustrate the disclosed techniques should not be considered limiting and only provide examples of implementation. Those skilled in the art will understand the other myriad ways of how the disclosed techniques may be implemented, which are contemplated herein and are within the bounds of the disclosure.

What is claimed is:

1. A method for tomographic image reconstruction of a sample, the method comprising:
   simplifying a forward projection model, the forward projection model based on an Alvarez-Macovski (AM) attenuation model, wherein simplifying of the forward projection model includes simplifying the AM attenuation model for one of photoelectric effect only, constant density throughout the sample, constant atomic number throughout the sample, and density proportional to atomic number; and
   performing an iterative reconstruction of the sample using the simplified forward projection model and a back projection, wherein measured image data of the sample obtained at a first energy is compared with an output of the simplified forward projection weighted by a first spectrum associated with the first energy, and wherein the back projection of the iterative reconstruction is non-adjoint to the simplified forward projection model, and wherein the back projection assuming monochromatic radiation.

2. The method of claim 1, wherein the simplification of the forward projection model for photoelectric effect only comprises ignoring a Compton scattering effects term in the AM attenuation model so that only the photoelectric effect term is implemented.

3. The method of claim 1, wherein the simplification of the forward projection model for constant density comprises projecting the AM attenuation model with density set at a constant.

4. The method of claim 1, wherein the simplification of the forward model for constant atomic number comprises projecting the AM attenuation model with atomic number set at a constant.

5. The method of claim 1, wherein the simplification of the forward model for density proportional to atomic number comprises setting atomic number to the density sample parameter weighted by a proportionality constant and substituting for atomic number in the AM attenuation model.

6. The method of claim 1, wherein simplifying a forward projection model comprises reducing a number of variables from two to one, wherein the two variables include density and atomic number, and wherein reducing the number of variables includes making density a function of atomic number or making atomic number a function of density.

7. The method of claim 1, further comprising:
determining the simplification of the AM attenuation model based on determining the simplification that minimizes residual error in performing the iterative reconstruction.

8. The method of claim 1, wherein performing the iterative reconstruction of the sample using the simplified forward projection model reduces beam hardening artifacts in the reconstruction.

9. The method of claim 1, wherein high energy data of the sample obtained from a high energy, low resolution scan is used to determine the simplification and beginning density and atomic number values used in the iterative reconstruction.

10. The method of claim 1, wherein low energy, high resolution data of the sample is used in the iterative reconstruction.

11. A system comprising:
a stage for mounting a sample;
an x-ray source coupled to provide x-rays for imaging the sample;
a detector coupled to receive the x-rays after traversing the sample; and
a controller coupled at least to the x-ray source and the detector, the controller including or coupled to one or more processors configured to execute code stored on a memory that when executed causes the controller to:
simplify a forward projection model, the forward projection model based on an Alvarez-Macovski (AM) attenuation model, wherein simplify the forward projection model includes simplify the AM attenuation model for one of photoelectric effect only, constant density throughout the sample, constant atomic number throughout the sample, and density proportional to atomic number; and
perform an iterative reconstruction of the sample using the simplified forward projection model and a back projection, wherein measured image data of the sample obtained at a first energy is compared with an output of the simplified forward projection weighted by a first spectrum associated with the first energy, and wherein the back projection of the iterative reconstruction is non-adjoint to the simplified forward projection model, and wherein the back projection assuming monochromatic radiation.

12. The system of claim 11, wherein the code for executing the simplification of the forward projection model for photoelectric effect only further includes code, that when executed, causes the controller to ignore a Compton scattering effects term in the AM attenuation model so that only the photoelectric effect term is implemented.

13. The system of claim 11, wherein the code for executing the simplification of the forward projection model for constant density further includes code, that when executed, causes the controller to project the AM attenuation model with density set at a constant.

14. The system of claim 11, wherein the code for executing the simplification of the forward model for constant atomic number density further includes code, that when executed, causes the controller to project the AM attenuation model with atomic number set at a constant.

15. The system of claim 11, wherein the code for executing the simplification of the forward model for density proportional to atomic number density further includes code, that when executed, causes the controller to set atomic number to the density sample parameter weighted by a proportionality constant and substituting for atomic number in the AM attenuation model.

16. The system of claim 11, wherein the code to simplify a forward projection model further includes code, that when executed, causes the controller to reduce a number of variables from two to one, wherein the two variables include density and atomic number, and wherein reducing the number of variables includes making density a function of atomic number or making atomic number a function of density.

17. The system of claim 11, further including code that when executed, causes the controller to:
determine the simplification of the AM attenuation model based on determining the simplification that minimizes residual error in performing the iterative reconstruction.

18. The system of claim 11, wherein to perform the iterative reconstruction of the sample using the simplified forward projection model reduces beam hardening artifacts in the reconstruction.

19. The system of claim 11, wherein the code, when executed by the one or more processors, causes the controller to obtain high energy data of the sample from a high energy, low resolution scan, and further cause the high energy data to be used to determine the simplification and beginning density and atomic number values used in the iterative reconstruction.

20. The system of claim 11, wherein low energy, high resolution data of the sample is used in the iterative reconstruction.

* * * * *